United States Patent [19]

Takanabe et al.

[11] Patent Number: 4,646,089
[45] Date of Patent: Feb. 24, 1987

[54] TRAVEL GUIDANCE SYSTEM FOR VEHICLES

[75] Inventors: Kazunori Takanabe, Kazugai; Masaki Yamamoto, Nagoya; Kenzo Ito, Okazaki; Hiroshi Fujinami, Kariya, all of Japan

[73] Assignee: Nippondenso Co., Ltd., Kariya, Japan

[21] Appl. No.: 568,794

[22] Filed: Jan. 6, 1984

[30] Foreign Application Priority Data

Jan. 17, 1983 [JP] Japan .................................. 58-5531

[51] Int. Cl.⁴ ........................ G08G 1/12; G01C 21/00
[52] U.S. Cl. ................................ 340/995; 73/178 R; 340/988; 353/12; 364/424; 364/449
[58] Field of Search ............... 340/995, 988, 990, 750, 340/798; 364/424, 460, 449; 353/12; 358/103; 73/178 R

[56] References Cited

U.S. PATENT DOCUMENTS

| | | | |
|---|---|---|---|
| 3,789,198 | 1/1974 | Henson et al. | 340/990 |
| 4,312,577 | 1/1982 | Fitzgerald | 340/995 |
| 4,513,377 | 4/1985 | Hasebe et al. | 340/990 |
| 4,514,810 | 4/1985 | Ito et al. | 340/995 |
| 4,527,155 | 7/1985 | Yamaki et al. | 340/995 |
| 4,571,684 | 2/1986 | Takanabe et al. | 340/995 |

FOREIGN PATENT DOCUMENTS 3235993  5/1983  Fed. Rep. of Germany ...... 340/995

*Primary Examiner*—James L. Rowland
*Assistant Examiner*—Brent A. Swarthout
*Attorney, Agent, or Firm*—Cushman, Darby & Cushman

[57] ABSTRACT

In a travel guidance system for vehicles, a map data storage medium preliminarily stores administrative division name data and/or landmark data, and a control unit has the function of retrieving the name of an administrative division to which the present position of a vehicle belongs and/or a landmark in the vicinity of the present position in accordance with present position data and displaying the retrieved administrative division name and/or the retrieved landmark on a display.

6 Claims, 7 Drawing Figures

TRAVEL GUIDANCE SYSTEM FOR VEHICLES

BACKGROUND OF THE INVENTION

The present invention relates to a travel guidance system for vehicles and more particularly to a travel guidance system for vehicles capable of computing the present position of a vehicle and displaying both a map and a present position mark on a display in which the name of an administrative division (e.g., the name of a city) to which the present position belongs and/or a landmark (e.g., the name of a well known building, major intersection, town) in the vicinity of the present position are displayed on the display.

Recently, travel guidance systems for vehicles have been developed in which as the vehicle travels, its present position is computed and displayed, along with a map on a display and a guidance system of this type generally includes (a) a heading sensor for detecting the direction of movement of a vehicle, (b) a distance sensor for detecting the distance traveled by the vehicle, (c) a map data storage medium preliminarily storing map data, (d) a control unit for receiving a heading signal from the heading sensor and a distance signal from the distance sensor to successively compute the present position of the vehicle and for generating video signals corresponding to display data including the map data from the map data storage medium and the present position data, and (e) a display responsive to the video signals from the control unit to display a map and a present position mark, thereby clearly indicating the traveling condition of the vehicle.

In the operation of a vehicle, there are cases in which the vehicle is run in a geographically strange place to the driver, etc., and in such a case the display of only a present position mark on a map cannot be said as providing the driver, etc., with a satisfactory travel guidance.

SUMMARY OF THE INVENTION

In view of these circumstances, it is an object of the present invention to provide an improved travel guidance system for vehicles which is so designed that even if a vehicle is traveling in a geographically strange place, the driver, etc., are positively informed of what sort of place the place in question is and the travel guidance is made fully substantial.

In accordance with the present invention there is thus provided a travel guidance system for vehicles including a heading sensor for detecting the direction of movement of a vehicle, a distance sensor for detecting the distance traveled by the vehicle, a map data storage medium preliminarily storing map data, a control unit for receiving a heading signal from the heading sensor and a distance signal from the distance sensor to successively compute the present position of the vehicle and for generating video signals corresponding to display data including the map data from the map data storage medium and the present position data, and a display responsive to the video signals from the control unit to display a map and a present position mark, wherein administrative division name data and/or landmark data are preliminarily stored in the map data storage medium and the control unit is adapted to perform the function of retrieving the name of that administrative division to which the present position belongs and/or a landmark in the vicinity of the present position in accordance with the present position data and also displaying the retrieved administrative division name and/or the retrieved landmark on the display.

BRIEF DESCRIPTION OF THE DRAWINGS

The present invention will become more apparent from the following description taken in conjunction with the accompanying drawings, in which.

5 is a diagram for explaining an exemplary procedure for dissplaying a desired map on the display.

DESCRIPTION OF THE PREFERRED EMBODIMENT

Figure 1:
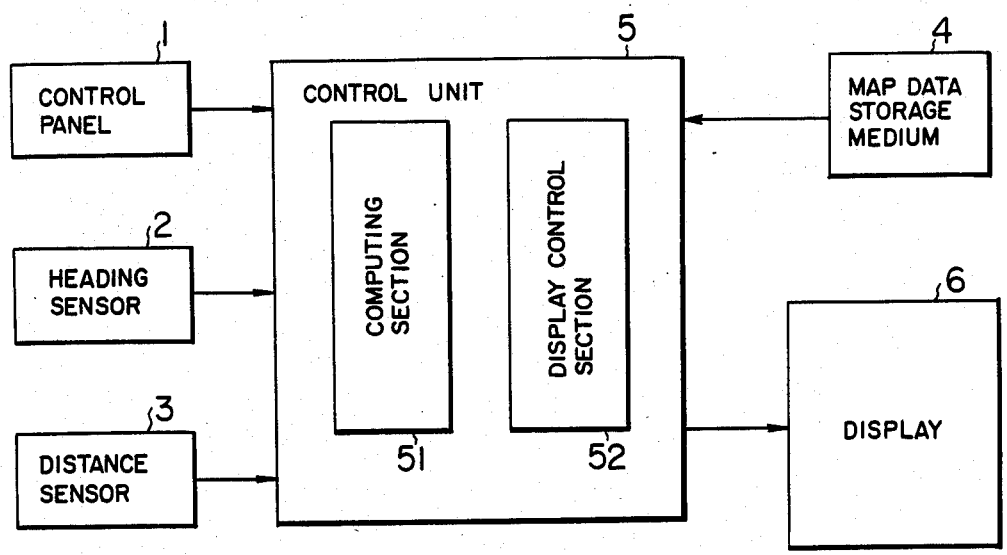
FIG. 1 is a block diagram showing the overall construction of an embodiment of a travel guidance system for vehicles in accordance to the present invention.

Referring to FIG. 1, there is illustrated the overall construction of a travel guidance system for vehicles according to an embodiment of the invention.

In the Figure, numeral 1 designates a control panel which is operated by the driver or the like to use the travel guidance system, 2 designates a heading sensor for detecting the direction of movement of the vehicle or the direction of the earth's magnetic field with respect to the vehicle, 3 designates a distance sensor for detecting the distance traveled by the vehicle, 4 designates a map data storage medium preliminarily storing given map data, 5 designates a control unit including a microcomputer and functionally divided into a computing section 51 and a display control section 52, and 6 designates a display for displaying at least a map, a present position mark, administrative division names and/or a landmark.

Figure 2:
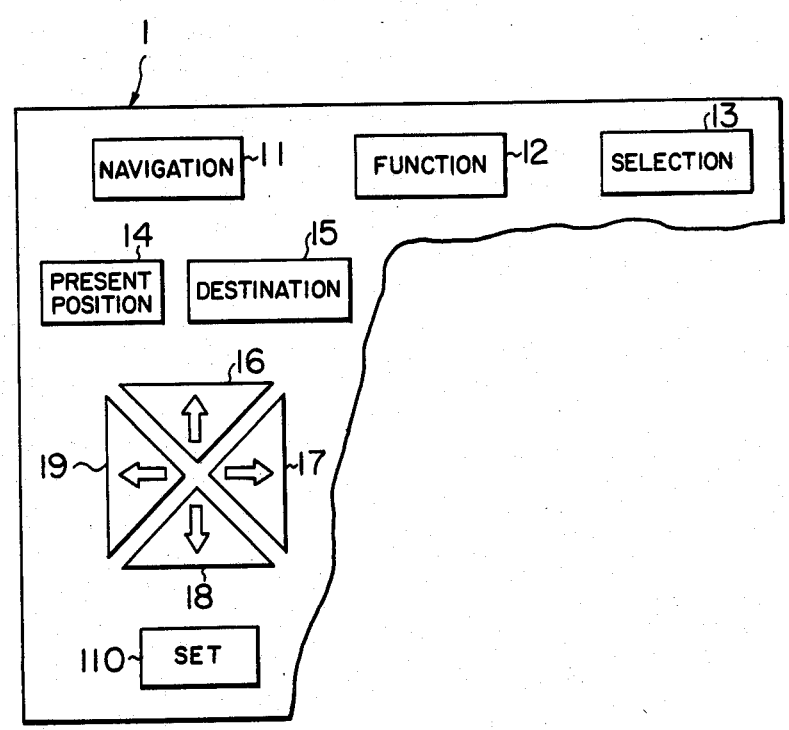
FIG. 2 is a diagram showing the arrangement of the principal keys of the control panel in the embodiment of FIG. 1.

The control panel 1, shown in more detail in FIG. 2, includes as its principal keys a navigation key (reset key) 11, a function key 12, a selection key 13, a present position key 14, a destination key 15, cursor keys 16 to 19 and a set key 110.

The heading sensor 2 includes a ring-shaped permalloy core, an excitation coil and two coils arranged perpendicular to each other whereby in response to the output voltages of the two coils, a heading signal for detecting the direction of movement of the vehicle with respect to the earth's magnetic field is supplied to the control unit 5.

The distance sensor 3 is designed so that the rotation of the speedometer cable is indirectly detected as an electric signal by a reed switch, magnetic sensitive element or photoelectric conversion element or the rotation of the transmission output shaft is detected as an electric signal by the similar means as mentioned previously thereby supplying to the control unit 5 a distance signal which is used for computing the distance traveled by the vehicle.

Figure 3:
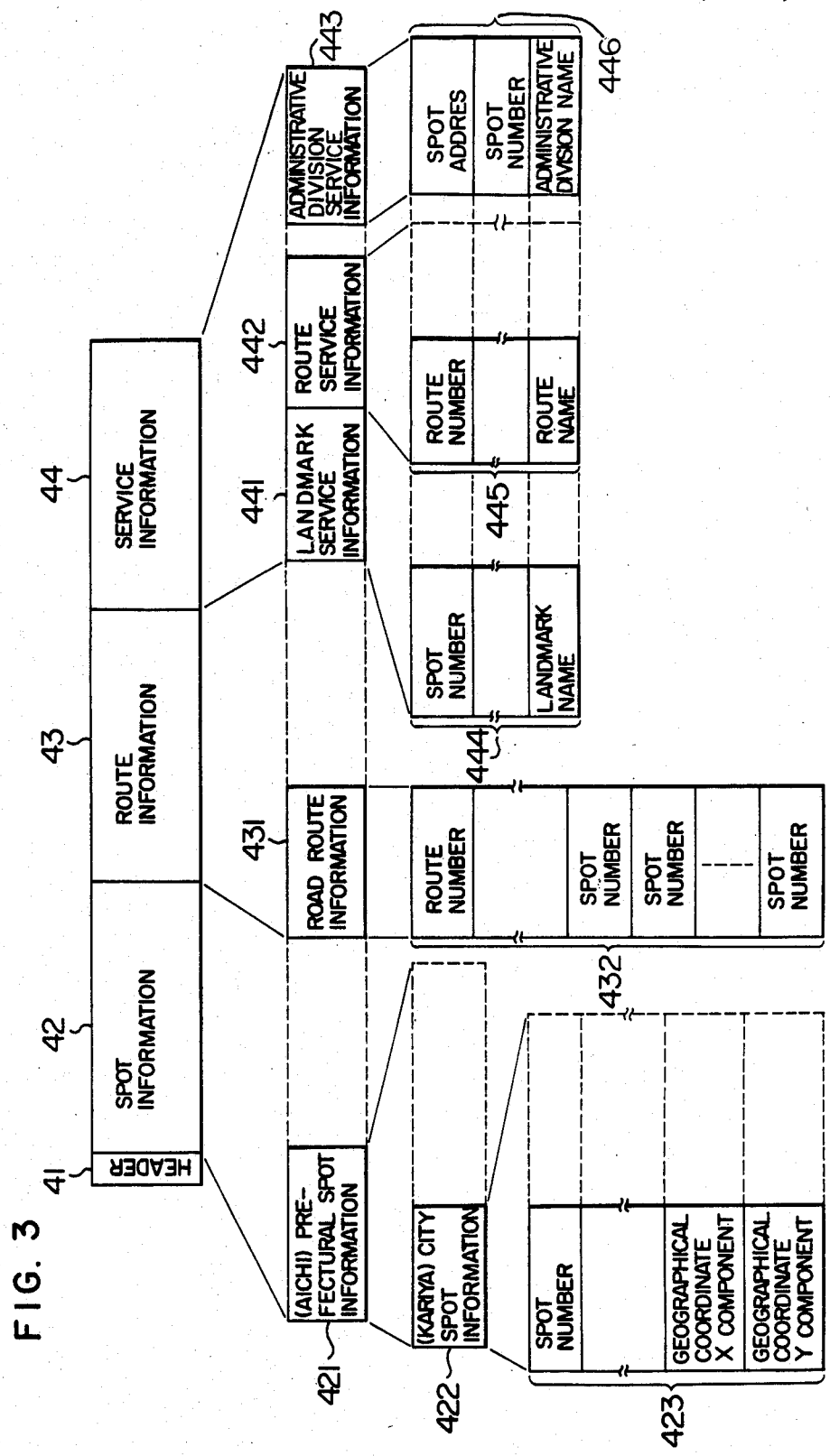
FIG. 3 is a diagram showing a map data format of the map data storage medium in the embodiment of FIG. 1.

The map data storage medium 4 includes a ROM (read-only memory) package. As shown in FIG. 3, for example, the data format of the map data preliminarily stored in the map data storage medium 4 includes a header 41 including prefecture identification symbols, spot information 42 relating to such spots as landmarks, route information 43 relating to such routes as national roads and service information 44 relating to various services. The spot information 42 is made up of primary division names including, for example, prefectural information 421 such as data of prefectures belonging to the district in question (e.g., Aichi Prefecture spot information relating to Aichi Prefecture), and each prefectural spot information 421 (e.g., the Aichi Prefecture spot information) is made up of secondary division names including, for example, city spot information 422 such as information of cities belonging to Aichi Prefecture. Each city spot information 422 (e.g., the Kariya City spot information) includes such information 423 relating to the principal spots belonging to the city of Kariya, and each information 423 includes such information as spot numbers and the X and Y components of geographical coordinates of the respective spots. The route information 43 includes classified route information 431 such as road route information relating to roads and each classified route information 431, e.g., road route information includes route numbers and a spot number group for the spots forming the road route. The service information 44 includes, for example, landmark service information 441, route service information 442 and administrative division service information 443, and the landmark service information 441 includes information 444 including spot numbers, landmark names, etc. The route service information 442 includes information 445 including route numbers, route names, etc. The administrative division service information 443 includes information 446 including spot address, spot number and administrative division name.

The control unit 5 includes a microprocessor unit (MPU), a read-only memory (ROM), a random-access memory (RAM), a video RAM, an output controller, etc., whereby the command signals from the control panel 1, the heading signal from the heading sensor 2, the distance signal from the distance sensor 3 and the map data from the map data storage medium 4 are received so that the necessary computational operations are performed and also the required display controls are performed on the display 6 thus applying video signals to the display 6.

Figure 4:
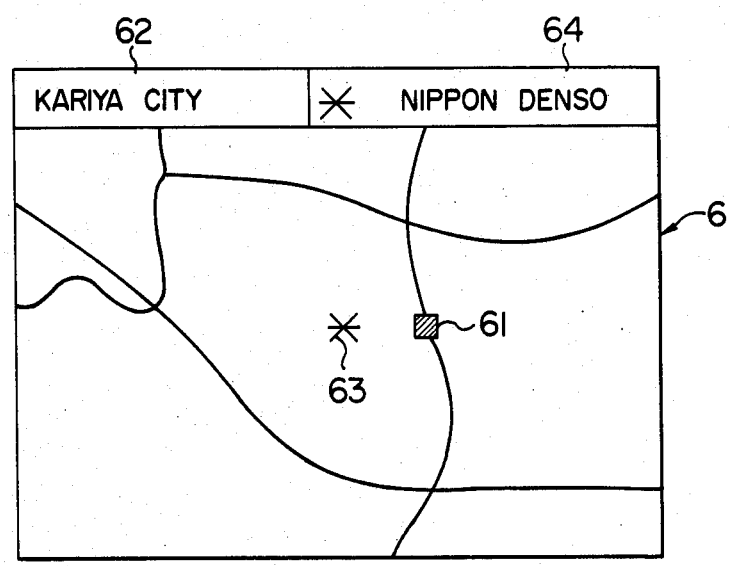
FIG. 4 is a diagram showing an exemplary display pattern on the display in the embodiment of FIG. 1.

The display 6 includes a CRT (cathode ray tube) and is responsive to the video signals from the control unit 5 to display for example (a) a map including roads, a railway, etc., (b) a present position mark 61 indicative of the present position of a vehicle, (c) an administrative division name 62 to which the present position belongs, (d) a location mark 63 of a building or the like serving as a landmark in the vicinity of the present position, (e) a name 64 of the landmark, etc., on the display screen as shown in FIG. 4.

Figure 5:
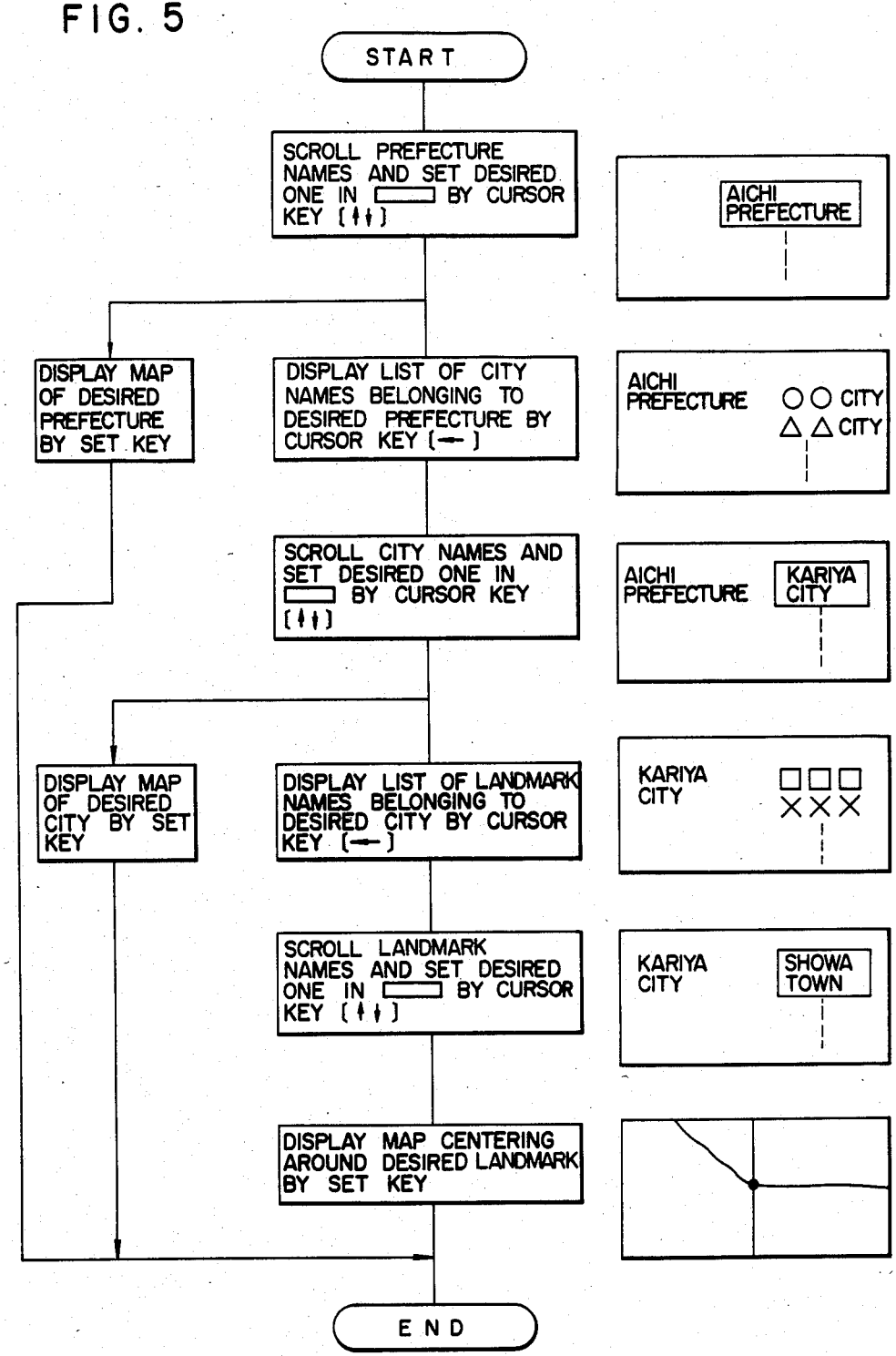

Next, an example of the procedure for displaying a map and a present position mark on the display 6 will be described with reference to FIG. 5.

After the ignition switch has been turned on, the navigation key 11 of the control panel 1 is depressed and the names of a given number of prefectures are displayed on the display 6. While looking at the list of the prefecture names on the screen of the display 6, the vehicle occupant operates the cursor key 16 or 18 so as to display in a specified screen area the name of that prefecture to which the present position of the vehicle belongs, e.g., Aichi Prefecture.

When it is desired to display the map of the whole Aichi Prefecture, then the set key 110 is depressed. Thus, the map of the whole Aichi Prefecture is displayed on the screen of the display 6.

On the other hand, when a more detailed map than the map of the whole Aichi Prefecture is desired, then the cursor key 19 is depressed. Thus, the names of a plurality of cities belonging to Aichi Prefecture, for example, are displayed on the screen of the display 6. While looking at the names of these cities, the occupant operates the cursor key 16 or 18 in such a manner that the name of any desired city, e.g., Kariya City is displayed in the specified screen area.

If the map of the whole Kariya City is desired then the set key 110 is depressed. This causes the map of the whole Kariya City to be displayed on the screen of the display 6.

On the other hand, if a more detailed map than the map of the whole Kariya City is desired then the cursor key 19 is depressed. As a result, the names of a plurality of landmarks belonging to Kariya City, for example, are displayed on the screen of the display 6. While looking at the names of these landmarks, the occupant operates the cursor key 16 or 18 in such a manner that the name of any desired landmark, e.g., Showa Town is displayed in the specified screen area. Then the set key 110 is depressed. As a result, the map of the whole Showa Town is displayed on the screen of the display 6.

By operating the control panel 1 in this way, it is possible to display any desired map on the screen of the display 6. The data of the landmark service information 443 of the map data storage medium 4 are used for display of the above administrative names and the data of the spot information 42 corresponding to the administrative names are used for map display.

Thereafter, while looking at the map displayed in the above-mentioned manner, the present position key 14 is operated first and then any one of the cursor keys 16 to 19 is operated so as to arrange or set the present position mark 61 on the map.

Figure 6:
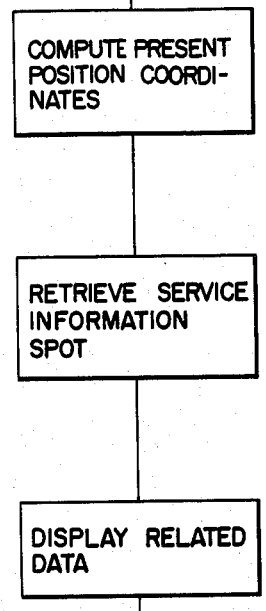
FIGS. 6 and 7 are flow charts for explaining the principal processes of the control unit in the embodiment of FIG. 1.
Figure 7:
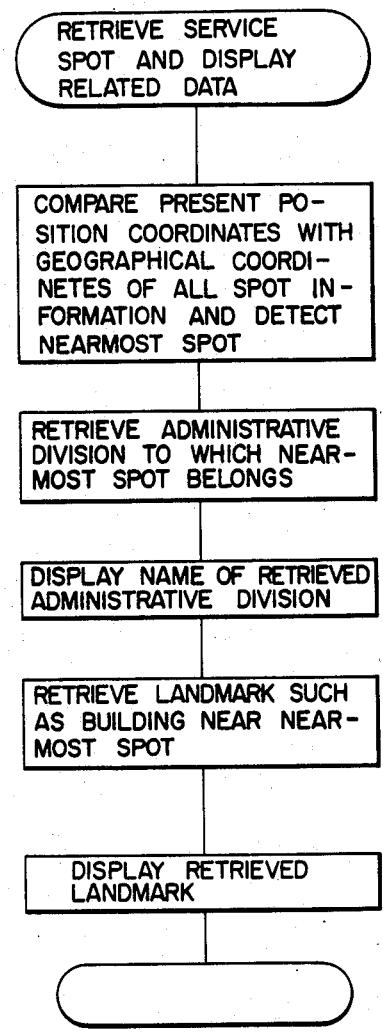

Next, some principal processes of the control unit 5 will be described by way of example with reference to FIGS. 6 and 7.

When the vehicle is running, the control unit 5 receives the heading signal from the heading sensor 2 and the distance signal from the distance sensor 3 and successively computes the coordinates of the present position of the vehicle by a known method. Then, in accordance with the result of the computation or the present position coordinate data and the map data on the map data storage medium 4, service information points (i.e., the administrative division to which the present position belongs and a landmark near the present position) are retrieved and the related data (i.e., the name of the administrative division concerned and the name and position of the landmark concerned) are displayed on the screen of the display 6. In this case, the retrieval of the service information points and the display of the related data are performed as shown in FIG. 7. More specifically, the computed present position coordinates are first compared with the geographical coordinates of all the spot information contained in the map data on the map data storage medium 4 to detect the nearmost spot which is closest to the present position. For instance, if the coordinates of the present position are represented as (X, Y) and the coordinates of a given spot on the map are represented as (Xa, Ya), then the distance between the present position and the given spot is obtained by computing $|X-Xa|+|Y-Ya|$ and the nearmost spot is determined in accordance with the computed distance. Then, that administrative division to which the thus determined nearmost spot belongs is retrieved by comparing the spot number corresponding to the nearmost spot with the spot numbers of the administrative service information 443 and the name 62 of this administrative division is displayed on the screen of the display 6 from the name information of the administrative service information 443. Then, a landmark such as a building in the vicinity of the nearmost spot is retrieved by comparing the spot number corresponding to said nearmost spot with the spot number of the landmark service information 441 and the name 64 and the position 63 of this landmark are displayed on the screen of the display 6 from the landmark name corresponding to the spot number of the landmark and the earth map.

Note that the display 6 is not limited to the CRT and it may be a liquid crystal display, EL display or the like. Also, while the map data storage medium 4 includes an ROM, it may include a magnetic tape, magnetic disk, magnetic bubbles or the like. In this case, a reader for reading the map data is of course required. Also, while the heading sensor 2 is of the type which detects the earth's magnetic field, it is possible to use a sensor of the gyro type which detects the relative direction of movement of the vehicle.

As described hereinabove, this invention is directed to a travel guidance system comprising a heading sensor for detecting the direction of movement of a vehicle, a distance sensor for detecting the distance traveled by the vehicle, a map data storage medium preliminarily storing map data, a control unit for receiving a heading signal from the heading sensor and a distance signal from the distance sensor to successively compute the present position of the vehicle and for generating video signals corresponding to display data including the map data from the map data storage medium and the present position data and a display responsive to the video signals from the control unit to display a map and a present position mark, wherein administrative division name data and/or landmark data are preliminarily stored in the map data storage medium and the control unit has the function of retrieving the name of an administrative division to which the present position belongs and/or a landmark in the vicinity of the present position and displaying the administrative division name and/or the landmark on the display.

Thus, in accordance with this invention, even if the vehicle is running in a geographically strange place, the desired administrative division name and/or the desired landmark are displayed on the display screen and the occupant is allowed to know the present position easily thereby accomplishing a fully substantial travel guidance.

We claim:

1. A travel guidance system for vehicles including:
    a heading sensor for detecting a direction of movement of a vehicle;
    a distance sensor for detecting a distance traveled by said vehicle;
    a map data storage medium preliminarily storing map data;
    a control unit for receiving a heading signal from said heading sensor and a distance signal from said distance sensor to successively compute a present position of said vehicle and for generating video signals corresponding to display data including map data from said map data storage medium and data of said present position; and
    a display having first and second display portions and responsive to said video signals from said control unit to display on said first display portion a map and a present position mark, in which:
    said map data storage medium comprises means for preliminarily storing administrative division name data and landmark data; and
    said control unit comprises:
    landmark display means for: (1) determining a landmark closest to said present position, (2) causing a position of said landmark to be displayed on said map and (3) retrieving a landmark massage concerning said landmark from said storage medium to cause said display to display said landmark message on said second display portion;
    division name display means for retrieving the name of an administrative division to which said present position belongs from said storage medium and causing said display to display a division name message on said second display portion; and
    selection means for selectively actuating at least one of said landmark display means and said division name display means.

2. A travel guidance system according to claim 1 wherein said map data storage medium includes a read-only memory having data format consisting of a header area storing prefecture identification symbols, a spot information area storing landmark information, a route information area storing route information, and a service information area storing services information.

3. A travel guidance system according to claim 1 wherein said control unit includes:
    first means responsive to depression of a set key for providing to said display a first display signal indicative of a prefecture name displayed within a first specified screen area of said second display portion, said prefecture name being selected by a cursor key;
    second means responsive to the depression of the set key for providing to said display a second display signal indicative of a city name belonging to said selected prefecture name provided by said first means and displayed within a second specified screen area of said second display portion, said city name being selected by the cursor key; and
    third means responsive to the depression of the set key for providing to said display a third display signal indicative of a landmark name belonging to said selected city name provided by said second means and displayed within a third specified screen area of said second display portion, said landmark name being selected by the cursor key.

4. A travel guidance system according to claim 2 wherein said control unit includes:
    first means responsive to depression of a set key for providing to said display a first display signal indicative of a prefecture name displayed within a first specified screen area of said second display portion, said prefecture name being selected by a cursor key;
    second means responsive to the depression of the set key for providing to said display a second display signal indicative of a city name belonging to said selected prefecture name provided by said first means and displayed within a second specified screen area of said second display portion, said city name being selected by the cursor key; and third means responsive to the depression of the set key for providing to said display a third display signal indicative of a landmark name belonging to said selected city name provided by said second means and displayed within a third specified screen area of said second display portion, said landmark name being selected by the cursor key.

5. A travel guidance system according to claim 1 wherein said storage medium stores a plurality of primary division names, said primary division names being indicative of administrative divisions obtained by dividing said map into a plurality of wide divisions, and a plurality of secondary division names, said secondary division names being indicative of administrative divisions obtained by dividing each of the primary divisions into a plurality of smaller divisions.

6. A travel guidance system for vehicles including:

present position detecting means for detecting a present position of a vehicle;

a map data storing means for preliminarily storing map data;

a control unit, responsive to said present position detecting means and said map data storing means for generating video signals corresponding to display data including map data from said map data storing means and data of said present position; and a display means having first and second display portions and responsive to said video signals from said control unit to display a present position mark and a map of an administrative division to which said present position belongs, wherein:

said map data storing means comprises means for preliminarily storing at least landmark data including a name and explanation of the landmark; and said control unit comprises landmark display means for determining a landmark closest said present position to cause said display means to display a position of the landmark on said map and for reading the landmark data from said map data storing means to cause said display means to display said landmark data on said second display portion.

* * * * *